(12) United States Patent
Ichikawa et al.

(10) Patent No.: US 9,086,293 B2
(45) Date of Patent: Jul. 21, 2015

(54) NAVIGATION DEVICE AND CONTROL METHOD FOR DISPLAYING DETOUR

(71) Applicant: Alpine Electronics, Inc., Tokyo (JP)

(72) Inventors: Takashi Ichikawa, Tokyo (JP); Takahiro Oshika, Saitama (JP); Norimitsu Nishikawa, Tokyo (JP); Makoto Abe, Tokyo (JP); Noboru Yamazaki, Iwaki (JP); Mitsuru Suzuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 7 days.

(21) Appl. No.: 13/954,600

(22) Filed: Jul. 30, 2013

(65) Prior Publication Data
US 2014/0058671 A1    Feb. 27, 2014

(30) Foreign Application Priority Data

Aug. 23, 2012 (JP) .................................. 2012-183834

(51) Int. Cl.
*G01C 21/36* (2006.01)
*G01C 21/34* (2006.01)
(Continued)

(52) U.S. Cl.
CPC ........ *G01C 21/3492* (2013.01); *G01C 21/3415* (2013.01); *G01C 21/3694* (2013.01); *G08G 1/0969* (2013.01); *G08G 1/096827* (2013.01); *G08G 1/096844* (2013.01)

(58) Field of Classification Search
CPC .......... G01C 21/3415; G01C 21/3461; G01C 21/3492; G01C 21/367; G01C 21/3676; G01C 21/3694
USPC ................. 701/423, 432, 437, 455, 457, 533
See application file for complete search history.

(56) References Cited

U.S. PATENT DOCUMENTS 5,031,104 A * 7/1991 Ikeda et al. .................... 701/428
5,925,091 A * 7/1999 Ando ............................. 701/455
(Continued)

FOREIGN PATENT DOCUMENTS

JP         9042984       2/1997
JP       11037784 A  *  2/1999  ............. G01C 21/00
(Continued)

OTHER PUBLICATIONS

JPO machine translation of JP 2012-78171 (original JP document published Apr. 19, 2012).*
(Continued)

*Primary Examiner* — Behrang Badii
*Assistant Examiner* — David Testardi
(74) *Attorney, Agent, or Firm* — Brinks Gilson & Lione

(57) ABSTRACT

The navigation device includes a detour exploring portion configured to explore a detour to avoid a section in which a traffic hazard occurs using map data at a level lower than a predetermined level when a traffic hazard determining portion determines that the traffic hazard occurs on the guidance route, and a display control portion configured to zoom the detour to match a scale of the detour to a currently designated scale, and synthesize and display the detour on a map image. The navigation device maintains the display of the wide area map and synthesizes and additionally displays a detour, for example, to pass through a road such as a narrow street included in a detailed map on the map image such that the user can receive, at a glance, a detour to easily bypass the section in which a traffic hazard occurs.

16 Claims, 4 Drawing Sheets

(51) Int. Cl.
*G08G 1/0968* (2006.01)
*G08G 1/0969* (2006.01)

(56) References Cited

U.S. PATENT DOCUMENTS

| | | | | |
|---|---|---|---|---|
| 6,052,645 | A | * | 4/2000 | Harada .................... 701/423 |
| 6,067,502 | A | * | 5/2000 | Hayashida et al. .......... 701/428 |
| 6,101,443 | A | * | 8/2000 | Kato et al. ................. 701/414 |
| 6,118,389 | A | * | 9/2000 | Kamada et al. ........ 340/995.21 |
| 6,732,049 | B2 | * | 5/2004 | Sato et al. .................. 701/416 |
| 6,882,931 | B2 | * | 4/2005 | Inoue ........................ 701/533 |
| 6,895,331 | B2 | * | 5/2005 | Yoshida ..................... 701/533 |
| 6,950,746 | B2 | * | 9/2005 | Yano et al. ................. 701/411 |

FOREIGN PATENT DOCUMENTS

| | | | | | |
|---|---|---|---|---|---|
| JP | 2001141480 | A | * | 5/2001 | ............ G01C 21/00 |
| JP | 2002310702 | A | * | 10/2002 | ............ G01C 21/00 |
| JP | 2004053322 | A | * | 2/2004 | ............ G01C 21/00 |
| JP | 2005043302 | A | * | 2/2005 | ............ G01C 21/00 |
| JP | 2006266803 | A | * | 10/2006 | |
| JP | 2006275729 | | | 10/2006 | |
| JP | 2007010677 | A | * | 1/2007 | |
| JP | 2008046059 | A | * | 2/2008 | |
| JP | 2011064490 | A | * | 3/2011 | |
| JP | 2012078171 | A | * | 4/2012 | |

OTHER PUBLICATIONS

JPO machine translation of JP 2006-275729 (original JP document published Oct. 12, 2006).*

JPO machine translation of JP 2006-266803 (original JP document published Oct. 5, 2006).*

JPO machine translation of JP 2005-43302 (original JP document published Feb. 17, 2005).*

* cited by examiner

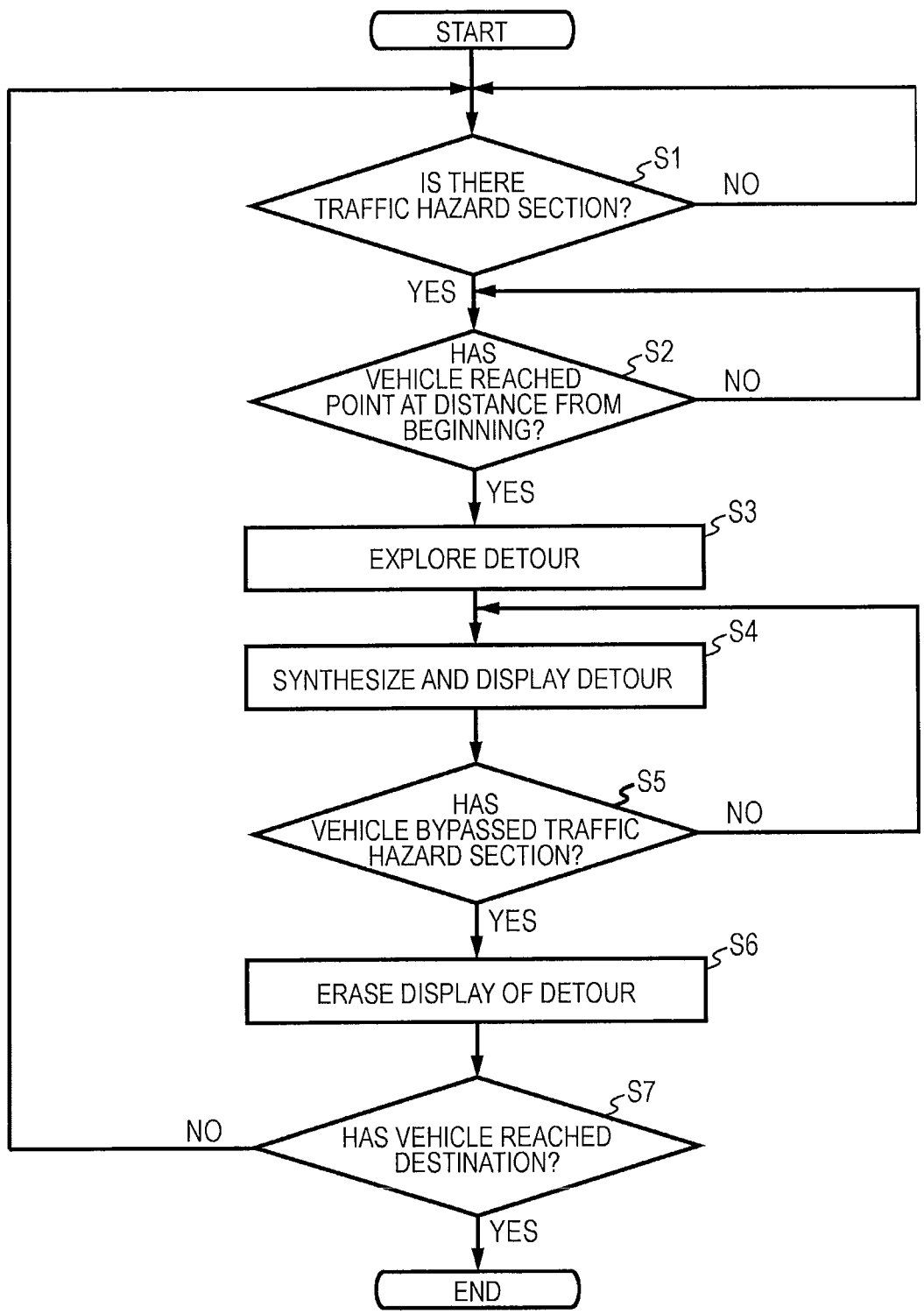

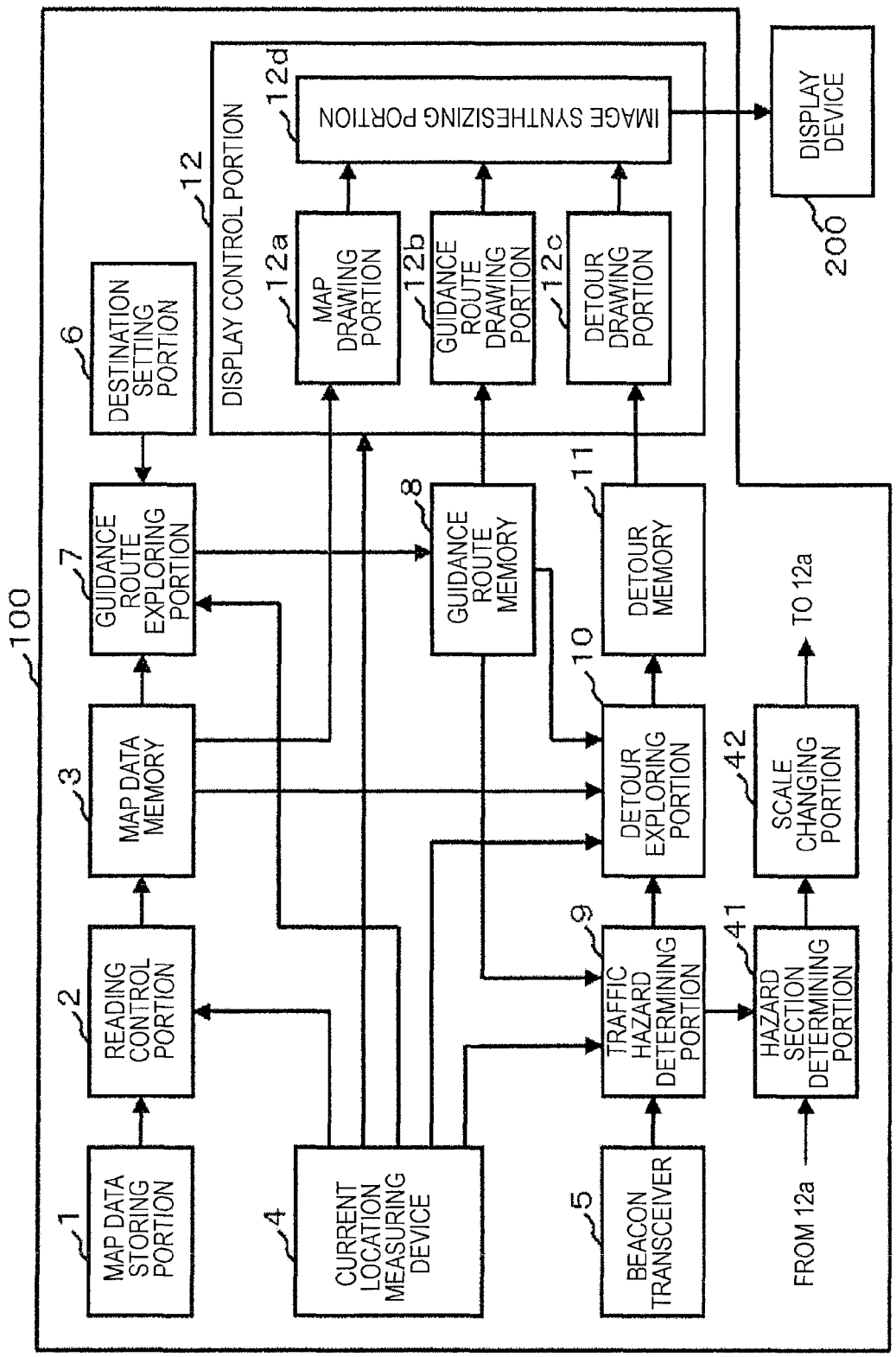

NAVIGATION DEVICE AND CONTROL METHOD FOR DISPLAYING DETOUR

RELATED APPLICATION

The present application claims priority to Japanese Application Number 2012-183834, filed Aug. 23, 2012, the entirety of which is hereby incorporated by reference.

BACKGROUND

1. Field of the Invention

The present invention relates to a navigation device and a control method for displaying a detour and, in particular, to a navigation device and a control method for displaying a detour when a traffic hazard, for example, a traffic jam occurs on a guidance route.

2. Description of the Related Art

A car-mounted navigation device generally detects a current location of the vehicle using an autonomous navigation sensor, a Global Positioning System (GPS) receiver, or the like and reads map data near the location from a storage medium to display a map on a screen. Then, a driver's location mark that shows the vehicle location is also superimposed and displayed at a predetermined point on the screen such that the location where the vehicle currently runs can be found at a glance.

Further, the navigation device includes a route guidance function. The route guidance function automatically explores a lowest-cost route connecting the current location to the destination using the map data and draws the explored route as a guidance route on the map screen with a different color from the other routes and with a thick line. Further, when the vehicle approaches a point within a predetermined distance from an intersection to which the vehicle is guided on the guidance route, the device displays an enlarged map of the intersection to show the information about the intersection in such a way as to guide the driver to a destination.

Further, most of navigation devices include a traffic information providing function. The navigation device can receive the road traffic information sent from a road traffic information center and display the changing road condition on the screen using the traffic information providing function. A navigation device including such a traffic information providing function can provide a user with the road traffic information including the information about a traffic jam or the information about a regulation in real time.

Some of the navigation devices including such route guidance function and traffic information providing function also include a function for automatically exploring a detour to avoid a traffic jam according to the received road traffic information (see JP 09-042984 A and JP 2006-275729 A, for example). The technique disclosed in JP 09-042984 A is configured to explore an available detour from the intersection to which the vehicle is guided on the guidance route and display the detour when the vehicle approaches the intersection to which the vehicle is guided. The technique disclosed in JP 2006-275729 A is configured to store information about the frequently-used shortcuts and back roads in the map data to selectively extract only the shortcut or the back road to go along the guidance route toward the destination from among the shortcuts and back roads and display the extracted shortcut or back road on the screen.

Map data used for a navigation device is generally layered in units referred to as levels and managed. The levels include a higher level at which a map shows a panoramic view of a wide area, and a lower level at which a map depicts the detail of a narrow area. The map data at one of the layers is read according to the scale designated by the user and then a map is displayed on the screen based on the map data. The smaller scale the wide area map is on, the fewer the elements (roads, icons or the like) are displayed on the map. The larger scale the detailed map is on, the more the elements are displayed on the map.

Accordingly, there is a problem in that a road that is not included in the map data at the level corresponding to the currently designated scale (currently displayed on the screen) cannot be displayed as a detour even if a detour is explored near the intersection to which the vehicle is guided as described in JP 09-042984 A. Similarly, there is a problem in that a road that is not included in the map data at the level corresponding to the currently designated scale cannot be displayed as a shortcut or a back road even if a shortcut or a back road is displayed as described in JP 2006-275729 A.

There is a problem in that, if it is desirable that narrow roads such as a narrow street are displayed as detours, shortcuts or back roads, it is necessary to change the designation of the scale to a level at which the detailed map of the city is displayed, and this complicates the operation. Further, there is a problem in that, if the scale is increased to a level at which the detailed map of the city is displayed, it is difficult to see an overview the detour, the shortcut, or the back road. This brings a feeling of anxiety to the driver because it is difficult for the driver to know the route of the detour or how far is the detour. A road having a width of less than 5.5 m is referred to as a narrow street in Japan. The narrow street corresponds to a road referred to as a minor street or a secondary street in the United States.

SUMMARY

In light of the foregoing, an objective of the present invention is to show the user a detour to avoid a traffic hazard, for example, a traffic jam, in an easily understood manner without an operation for changing the scale to be larger, even if the small-scale wide area map is currently displayed.

To solve the above-mentioned problems, according to the present invention, map data at a level lower than a predetermined level is used for exploring a detour for avoiding a section in which a traffic hazard occurs when the occurrence of the traffic hazard on the guidance route is detected. Then, the image of the explored detour is synthesized and displayed on the map image on the currently designated scale while being zoomed in order to match the scale of the image to the currently designated scale.

According to the present invention having the above-mentioned configuration, while a small-scale wide area map is displayed, the display of the wide area map is maintained and a detour to pass through a road included in a detailed map showed using map data at a level lower than a predetermined level is synthesized and additionally displayed. The detour is synthesized and displayed on the wide area map while the routes included in the detailed map are zoomed. This can display the detour over a wide area. Thus, the user can receive an overview of the detour. Thus, according to the present invention, a detour to avoid a traffic hazard, for example, a traffic jam, can be shown to the user in an easily understood manner without a user's complicated operation for changing the scale.

BRIEF DESCRIPTION OF THE DRAWINGS

FIG. 3 is a flowchart for describing an exemplary operation of the navigation device according to an embodiment; and FIG. 4 is a block diagram for illustrating another example of the functional configuration of the navigation device according to an embodiment.

DETAILED DESCRIPTION

Figure 1:
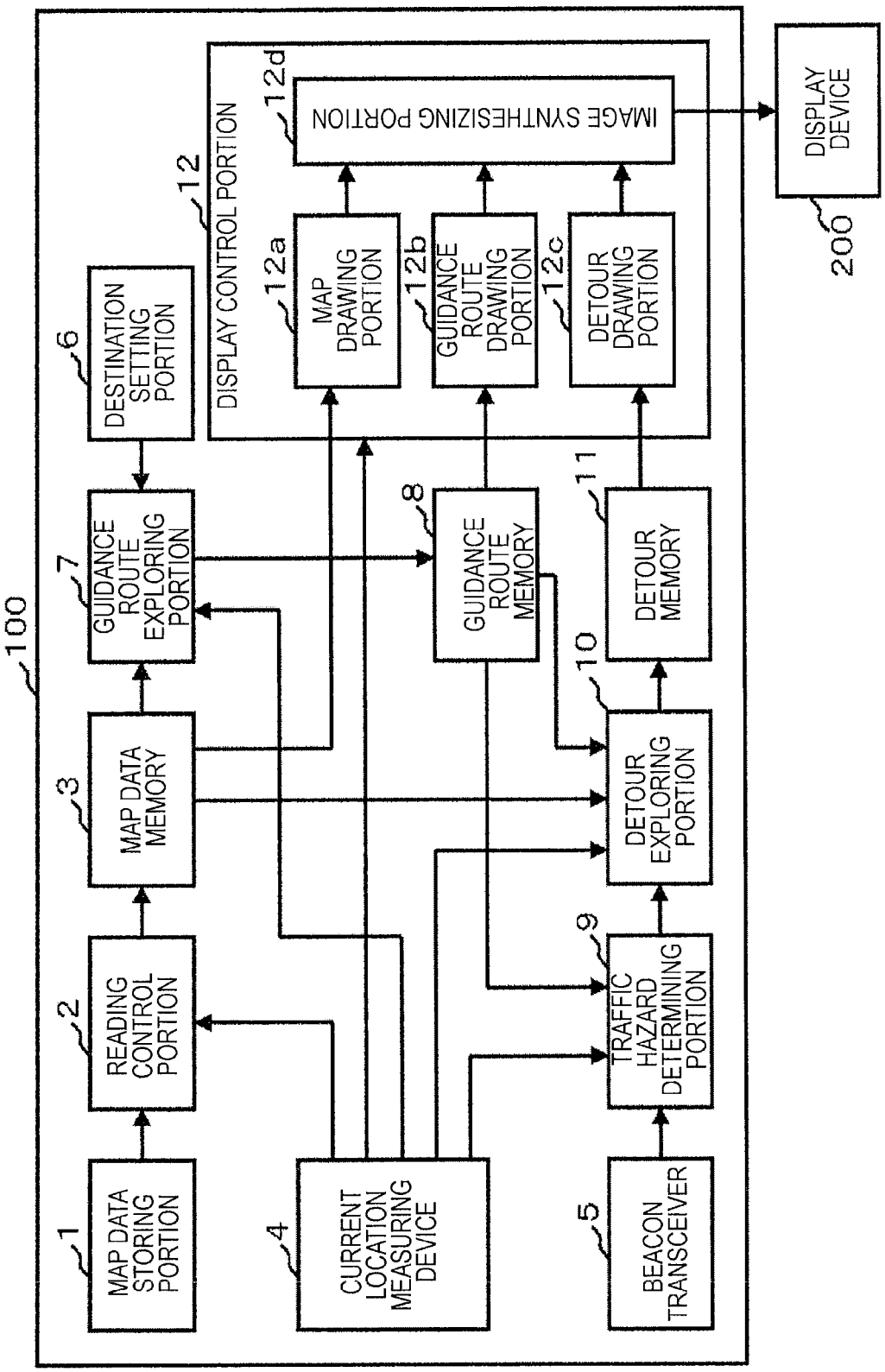
FIG. 1 is a block diagram of an example of the functional configuration of a navigation device according to an embodiment.

Hereinafter, an embodiment of the present invention will be described based on the drawings. FIG. 1 is a block diagram of an example of the functional configuration of a navigation device 100 in the present embodiment. As illustrated in FIG. 1, the navigation device 100 according to the present embodiment includes, as its functional components, a map data storing portion 1, a reading control portion 2, a map data memory 3, a current location measuring device 4, a beacon transceiver 5, a destination setting portion 6, a guidance route exploring portion 7, a guidance route memory 8, a traffic hazard determining portion 9, a detour exploring portion 10, a detour memory 11, and a display control portion 12. Further, the display control portion 12 includes, as its specific functional components, a map drawing portion 12a, a guidance route drawing portion 12b, a detour drawing portion 12c, and an image synthesizing portion 12d.

Note that each function of the reading control portion 2, the destination setting portion 6, the guidance route exploring portion 7, the traffic hazard determining portion 9, the detour exploring portion 10, and the display control portion 12 can be implemented by any of hardware, a Digital Signal Processor (DSP), and software. For example, when being implemented by software, each of the above-mentioned functions may include a CPU, an MPU, a RAM, a ROM, and the like that are included in the navigation device 100, and implementation may be by an execution of the program stored in the RAM or the ROM.

A hard disk, a semiconductor memory, or the like can be used as a recording medium for recording the above-mentioned program in addition to the RAM and the ROM. Further, the above-mentioned program can be downloaded to the navigation device 100 through a network, for example, the Internet.

The map data storing portion 1 is for storing map data necessary to display a map or explore a route and, for example, includes a hard disk. Note that a DVD, a CD-ROM, a semiconductor memory, or the like can be used as a recording medium included in the map data storing portion 1 in addition to the hard disk.

The map data recorded in the map data storing portion 1 is layered in units referred to as levels and managed. The levels include a higher level at which a map shows a panoramic view of a wide area, and a lower level at which a map depicts the detail of a narrow area. The map data at each of the levels includes various types of drawing data necessary to display a map, and road data necessary for various processes such as map matching, route exploring, or route guiding.

The higher the level of the map data that covers a wide area, the smaller the number of the roads that are included in the road data. In other words, the map data at a higher level primarily includes only the road data about main roads, and does not include the data about minor roads, such as narrow streets. On the other hand, the lower the level of the map data that shows the detailed narrow area, the larger the number of the roads that are included in the road data. In other words, the map data at a lower level includes a lot of data about minor roads, such as narrow streets.

The reading control portion 2 controls the process for reading the map data from the map data storing portion 1 and temporarily storing the map data in the map data memory 3. When a map around the current location of a vehicle is displayed on a display device 200, the reading control portion 2 inputs the information about the vehicle's current location from the current location measuring device 4 to read, from the map data storing portion 1, the map data within a predetermined range, including the vehicle's current location, and stores the map data in the map data memory 3.

On the other hand, when a guidance route is explored, the reading control portion 2 reads, from the map data storing portion 1, the map data within a predetermined range, including the range from the vehicle's current location to the destination, and stores the map data in the map data memory 3. Further, when a detour is explored, the reading control portion 2 reads, from the map data storing portion 1, the map data within a predetermined range, including the range from the vehicle's current location to the end of the detour (to be described in detail below), and stores the map data in the map data memory 3.

The current location measuring device 4 is for measuring the current location of the vehicle, and includes an autonomous navigation sensor, a GPS transceiver, a location calculating CPU, and the like. The autonomous navigation sensor includes a vehicle speed sensor (distance sensor) configured to output a pulse at predetermined intervals of the travel distance in order to detect the travel distance of the vehicle, and an angular velocity sensor (relative bearing sensor), for example, a vibrating gyro configured to detect the rotation angle of the vehicle (travel bearing). The autonomous navigation sensor detects the relative location and bearing of the vehicle using the vehicle speed sensor and the angular velocity sensor.

The location calculating CPU calculates the absolute location of the user's vehicle (estimated vehicle location) and the vehicle bearing based on the data of the relative location and bearing of the user's vehicle output from the autonomous navigation sensor. Further, the GPS transceiver receives the radio waves sent from a plurality of GPS satellites with a GPS antenna in order to calculate the absolute location and bearing of the vehicle by a three-dimensional positioning process or a two-dimensional positioning process (the vehicle bearing is calculated based on the user's vehicle current location and the user's vehicle location before a sampling time ΔT).

The beacon transceiver 5 bilaterally communicates with a radio wave beacon transceiver mainly placed on an expressway via radio waves and bilaterally communicates with an optical beacon transceiver mainly placed on a public road via lights in order to receive the road traffic information sent from a road traffic information center (not illustrated). The road traffic information includes the information indicating a road section in which a traffic hazard occurs due to a traffic jam, a construction, or the like.

The destination setting portion 6 sets a destination of the guidance route in response to a user operation of an operation portion (not illustrated). The guidance route exploring portion 7 explores a lowest-cost guidance route connecting the vehicle's current location that has been measured with the current location measuring device 4 to its destination that has been set with the destination setting portion 6 using the map data stored in the map data memory 3. The guidance route memory 8 temporarily stores the data about the guidance route explored with the guidance route exploring portion 7.

The traffic hazard determining portion 9 determines whether a traffic hazard occurs on the guidance route ahead of the current location based on the vehicle's current location that has been measured with the current location measuring device 4, the data about the guidance route stored in the guidance route memory 8, and the road traffic information received with the beacon transceiver 5.

When the traffic hazard determining portion 9 determines that a traffic hazard occurs, the detour exploring portion 10 explores a detour to avoid the section on the guidance route in which the traffic hazard occurs using the map data stored in the map data memory 3 and the data about the guidance route stored in the guidance route memory 8. At that time, the detour exploring portion 10 uses the map data at a level lower than a predetermined level in order to explore a detour. In that case, the map data at a predetermined level means the map data storing road network data, except for narrow streets. The map data at a level lower than the predetermined level means the map data storing road network data, including narrow streets. The navigation device 100 sets which level of the map data is to be used.

The detour exploring portion 10 determines whether the vehicle has reached a point at a predetermined distance from the beginning of the section on the guidance route in which the traffic hazard occurs, for example, based on the vehicle current location measured with the current location measuring device 4. When the vehicle has reached the point, the detour exploring portion 10 explores a detour. Alternatively, when the vehicle has reached the intersection at a predetermined distance from the beginning of the section on the guidance route in which the traffic hazard occurs (more specifically, a point at a predetermined distance from the intersection), the detour exploring portion 10 can explore a detour.

When exploring a detour, the detour exploring portion 10 provisionally sets the end of the detour in order to explore a low-cost detour connecting the current location to the end of the detour. At that time, the detour exploring portion 10 sets a high cost to the section on the guidance route in which the traffic hazard occurs in order to avoid exploring the section as a part of the detour. At that time, the end of the detour, for example, is a point on the guidance route and an intersection next to the end of the section in which the traffic hazard occurs (on the destination side).

In the present embodiment, a detour or a plurality of detours can be explored. Hereinafter, the embodiment will be described on the assumption that a plurality of detours is explored. When exploring a plurality of detours, the detour exploring portion 10 can explore a predetermined number of the detours in order of increasing the cost. Alternatively, the detour exploring portion 10 can explore the lowest-cost detour from among the detours avoiding the section in which the traffic hazard occurs and also can explore another detour connecting to the lowest-cost detour in order to explore a plurality of detours.

The detour memory 11 temporarily stores the data about the detour explored with the detour exploring portion 10. In the present embodiment, the detour exploring portion 10 explores a plurality of detours. Accordingly, the data about a plurality of the detours explored with the detour exploring portion 10 are stored in the detour memory 11.

The display control portion 12 controls the display of the navigation image on the display device 200. To perform the display control, the display control portion 12 includes the map drawing portion 12a, the guidance route drawing portion 12b, the detour drawing portion 12c, and the image synthesizing portion 12d.

The map drawing portion 12a draws a map image necessary for the display on the display device 200 based on the map data temporarily stored in the map data memory 3. At that time, the map drawing portion 12a draws the map image around the user's vehicle location according to the scale designated by the user and using the map data at a level corresponding to the scale. Note that, when the map data at a level corresponding to the currently designated scale is not included, the map drawing portion 12a performs digital zooming using the map data at a level near the scale in order to draw the map image around the user's vehicle location. Then, the map drawing portion 12a outputs a screen of the drawn map image to the image synthesizing portion 12d.

The guidance route drawing portion 12b draws the guidance route image based on the guidance route data stored in the guidance route memory 8. In other words, the guidance route drawing portion 12b selectively reads the data included in a screen of the map area currently output from the map drawing portion 12a to the image synthesizing portion 12d from among the guidance route data stored in the guidance route memory 8. Then, the guidance route drawing portion 12b draws the guidance route using the read guidance route data while emphasizing the guidance route with a predetermined color and with a thick line, and outputs the guidance route to the image synthesizing portion 12d.

The detour drawing portion 12c draws a detour image based on the detour data stored in the detour memory 11. As described above, the detour memory 11 stores the detour data about a plurality of detours. Accordingly, the detour drawing portion 12c draws a plurality of the detour images based on the data about the detours stored in the detour memory 11, respectively.

At that time, the detour drawing portion 12c selectively reads the data included in a screen of the map area currently output from the map drawing portion 12a to the image synthesizing portion 12d from among the detour data stored in the detour memory 11. Then, the detour drawing portion 12c draws the detour in a display form different from a road included in the map image on the designated scale using the read detour data in order to output the detour to the image synthesizing portion 12d. For example, the map drawing portion 12a draws a detour while highlighting the detour with a predetermined color different from the roads and guidance route included in the map image on the designated scale.

The image synthesizing portion 12d synthesizes various images and outputs the images to the display device 200. When a guidance route has been set, the image synthesizing portion 12d superimposes the guidance route image drawn with the guidance route drawing portion 12b on the map image drawn with the map drawing portion 12a in order to synthesize the images, and then outputs the result of the synthesis to the display device 200. This displays the information about the map around the user's vehicle location together with the guidance route on the screen of the display device 200.

When a detour is explored while the vehicle runs after a guidance route has been set, the image synthesizing portion 12d superimposes the guidance route image drawn with the guidance route drawing portion 12b and the detour image drawn with the detour memory 11 on the map image drawn with the map drawing portion 12a in order to synthesize the images, and then outputs the result from the synthesis to the display device 200. This displays the information about the map around the user's vehicle location together with the guidance route and the detour on the screen of the display device 200.

In the present embodiment, the map drawing portion 12a draws a map image according to the currently designated scale. On the other hand, the detour exploring portion 10 explores a detour using the map data at a lower level including narrow streets regardless of the currently designated scale and the detour drawing portion 12c draws the detour image using the explored detour data. Thus, the scale of the map image sometimes differs from the scale of the detour image when the detour image is superimposed on the map image to synthesize the images. In light of the foregoing, the image synthesizing portion 12d zooms out from the detour image drawn with the detour drawing portion 12c in order to match the scale of the detour image to the currently designated scale (the scale of the map image) and synthesizes the detour image with the map image.

At that time, in the present embodiment, the display of the guidance route is not erased to display a detour when the detour has been explored, but the display of the guidance route is maintained to additionally synthesize and display the detour. At that time, to distinguish the guidance route from the detour at a glance, the detour is displayed in a display form different from the guidance route. In other words, in the present embodiment, the detour is not explored instead of the original guidance route and is not placed as a new guidance route, but the display of the original guidance route as the guidance route is maintained and the detour is separately displayed in a form easy to understand at a glance.

Further, in the present embodiment, only the detour explored by the detour exploring portion 10 is synthesized and is displayed on the map image from among the roads included in the map data at a level lower than the predetermined level used when the detour has been explored. Although a lot of roads, such as a narrow street, are included in the map data at a lower level, displaying all of the roads complicates the screen. This makes it difficult for the user to instantaneously recognize which part is the detour. On the other hand, as in the present embodiment, synthesizing and displaying only the explored detour on the map image enables the user to instantaneously recognize the detour.

Figure 2A:
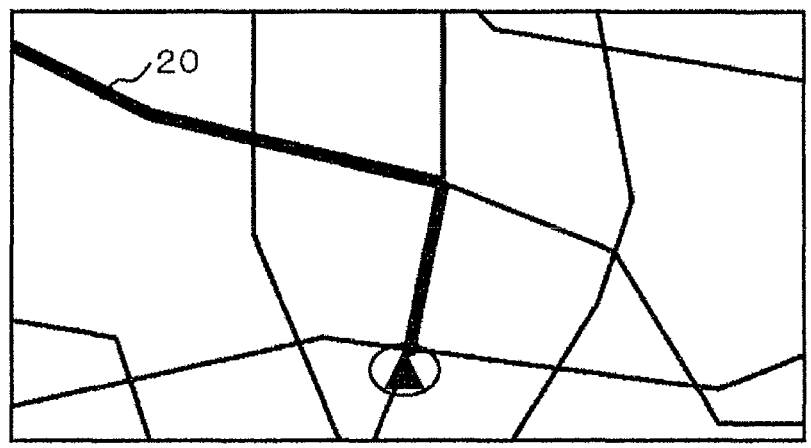
FIGS. 2A and 2B are views of exemplary navigation images displayed using a display control portion according to an embodiment.
Figure 2B:
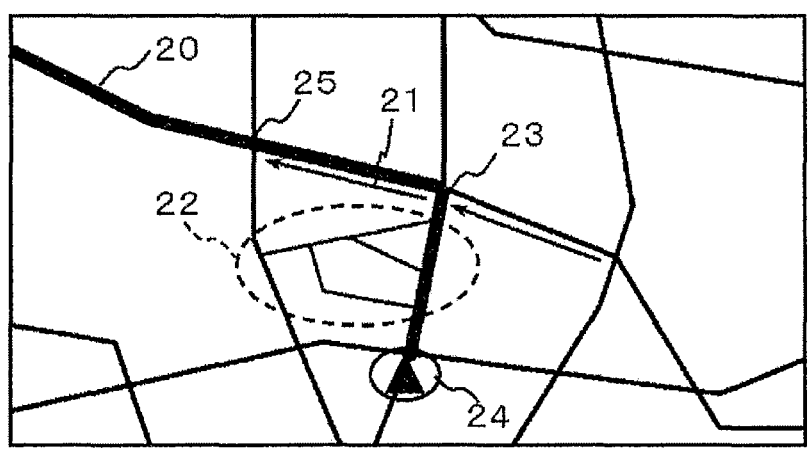

FIGS. 2A and 2B are views of exemplary navigation images displayed with the display control portion 12. FIG. 2A illustrates a state in which only a guidance route 20 is synthesized and displayed on the map image without the occurrence of a traffic hazard on the guidance route. On the other hand, FIG. 2B illustrates a state in which detours 22 to avoid a section in which the traffic hazard occurs are explored and are synthesized and displayed on the map image together with the guidance route 20 because the traffic hazard (traffic jam) occurs on the guidance route 20 as described with a reference sign 21.

In the example in FIG. 2B, when the vehicle reaches a point (current location) 24 at a predetermined distance from a beginning 23 of the section on the guidance route 20 in which the traffic hazard occurs, an intersection next to the end of the section in which the traffic hazard occurs and on the guidance route 20 has provisionally been set as a detour end 25, and three detours 22 that connect the current location 24 to the detour end 25 at low cost have been explored. Then, the three detours 22 are displayed in a form distinguishable from the guidance route 20 and the other roads without changing the scale currently designated in the current map image.

FIG. 3 is a flowchart of an exemplary operation of the navigation device 100 having the configuration as described above and according to the present embodiment. Note that the process of the flowchart illustrated in FIG. 3 is started when the vehicle starts running after a guidance route has been set. First, the traffic hazard determining portion 9 determines based on the road traffic information received with the beacon transceiver 5 whether a traffic hazard occurs on the guidance route (step S1).

When it is determined that a traffic hazard does not occur on the guidance route, the procedure in step S1 is continued. On the other hand, when it is determined that a traffic hazard occurs on the guidance route, the detour exploring portion 10 determines based on the vehicle current location measured with the current location measuring device 4 whether the vehicle has been reached a point at a predetermined distance from the beginning of the section in which the traffic hazard occurs on the guidance route (step S2).

When it is determined that the vehicle has not yet reached the point at a predetermined distance from the beginning of the section in which the traffic hazard occurs, the procedure in step S2 is continued. On the other hand, when it is determined that the vehicle has reached the point at a predetermined distance from the beginning of the section in which the traffic hazard occurs, the detour exploring portion 10 explores a detour to avoid the section in which the traffic hazard occurs using the map data at a level lower than a predetermined level (step S3).

The display control portion 12 zooms out from the detour explored with the detour exploring portion 10 in order to match the scale of the detour to the currently designated scale, and synthesizes and displays the detour on the map image on the currently designated scale together with the guidance route (step S4). After that, the display control portion 12 determines based on the vehicle current location measured with the current location measuring device 4 whether the vehicle has bypassed the section in which the traffic hazard occurs to the destination side (step S5).

When it is determined that the vehicle has not bypassed yet the section in which the traffic hazard occurs, the process goes back to step S4. On the other hand, when it is determined that the vehicle has bypassed the section in which the traffic hazard occurs, the display control portion 12 erases the synthesized and displayed detour from the navigation image (step S6).

After that, the traffic hazard determining portion 9 determines based on the vehicle's current location measured with the current location measuring device 4 and the data about the guidance route stored in the guidance route memory 8 whether the vehicle has reached the destination (step S7). When it is determined that the vehicle has not reached the destination yet, the process goes back to step S1. On the other hand, when it is determined that the vehicle has reached the destination, the process of the flowchart illustrated in FIG. 3 is terminated.

As described in detail above, in the present embodiment, when the occurrence of a traffic hazard on the guidance route is detected, a detour to avoid the section in which the traffic hazard occurs is explored using the map data at a level lower than a predetermined level. Then, the explored detour is zoomed out in order to match the scale of the detour to the currently designated scale and the detour is synthesized and displayed on the map image on the currently designated scale.

According to the present embodiment having the above-mentioned configuration, while a small-scale wide area map is displayed, the display of the wide area map is maintained and a detour, for example, to pass through a narrow street is synthesized and additionally displayed on the map. Further, according to the present embodiment, not all of the roads included in the map data at a lower level used for exploring the detour are synthesized and displayed, but only the explored detour is synthesized and displayed. Further, the detour is displayed in a form distinguishable from the roads and guidance route included in the map image on the currently designated scale.

This enables the user to receive a detour which the user can easily bypass the section in which a traffic hazard occurs and avoid a one-way road, an extremely narrow road or the like at a glance, without the effort of the operation for changing the scale to be larger in order to display a detailed map. Further, according to the present embodiment, the user can also receive an overview of the detour because the routes included in the detailed map are zoomed out in such a way to be synthesized and displayed on the wide area map and thus this can display the detour over the wide area. In the example illustrated in FIG. 2B, the entirety of the detours can be overviewed. Thus, the user can travel at ease along the displayed detour.

Note that the section in which the traffic hazard occurs is relatively short so that the section is included in a screen of the map on the currently designated scale in the example illustrated in FIG. 2B. Thus, the entirety of the explored detours is also displayed in the screen. However, if the section in which a traffic hazard occurs is long, the section is not included in a screen and thus the entirety of the explored detours is also not included in the screen. In such a case, the scale can automatically be changed such that the entirety of the section in which a traffic hazard occurs can be included in a screen. FIG. 4 is a view of an exemplary configuration for the above-mentioned case.

In the embodiment illustrated in FIG. 4, the configuration illustrated in FIG. 1 further includes a hazard section determining portion 41 and a scale changing portion 42. The hazard section determining portion 41 determines whether the entirety of the section in which a traffic hazard occurs is included in a screen of the map image drawn with the map drawing portion 12a on the currently designated scale when the traffic hazard determining portion 9 determines that the traffic hazard occurs.

The scale changing portion 42 automatically changes the scale to a scale at which the entirety of the section in which a traffic hazard occurs is included in a screen when it is determined that the entirety of the section in which a traffic hazard occurs is not included in a screen on the currently designated scale, and then notifies the fact to the map drawing portion 12a. After receiving the notification, the map drawing portion 12a draws a map image according to the changed scale. Further, the image synthesizing portion 12d zooms our from the detour image drawn with the detour drawing portion 12c based on the detour data stored in the detour memory 11 in order to match the scale of the detour image to the scale changed with the scale changing portion 42, and synthesizes and displays the detour image on the map image on the changed scale.

Note that, although it is determined in the example whether the entirety of the section in which a traffic hazard occurs is included in a screen of the map image on the currently designated scale, the present invention is not limited to the determination. For example, it can be determined whether the entirety of the detour explored with the detour exploring portion 10 is included in a screen of the map image on the currently designated scale.

Further, although the example in which the detour is highlighted and displayed has been described in the above-mentioned embodiment, the present invention is not limited to the example. In other words, any form other than the highlight display can be used as long as the form is distinguishable from the roads and guidance route included in the map image on the currently designated scale.

Further, although the fact that the explored detours are displayed in forms distinguishable from each other has not been mentioned in the embodiment, the explored detours can be displayed in such forms. In that case, the detours are preferably displayed such that it can be determined at a glance which detour is the smallest in cost.

Further, although the example in which a detour is explored using the map data at a preset level lower than a predetermined level regardless of the currently designated scale has been described in the above-mentioned embodiment, the present invention is not limited to the example. For example, when the currently designated scale is already set at a level lower than the predetermined level, a detour can be explored using the map data at a level corresponding to the scale.

Further, although the example in which a level lower than a predetermined level is set to be a level at which a narrow street is included in the road data to the navigation device 100, the present invention is not limited to the example. For example, the navigation device 100 includes a route exploring road database including a lower level storing the road network data, including a narrow street, and an upper level storing the road network data, except a narrow street. The navigation device 100 can refer only to the lower level while exploring a detour. Further, on the assumption that the predetermined level is a level corresponding to the currently designated scale, a detour can be explored using the map data at a level that is n (n is one or more) levels below the level corresponding to the currently designated scale.

Further, the above-mentioned embodiment merely describes a specific example when the present invention is implemented. This shall not make a restrictive interpretation of the technical scope of the present invention. In other words, the present invention can be variously implemented without departing from the gist or main feature of the present invention.

While there has been illustrated an described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. A navigation device comprising:
    a traffic hazard determining portion configured to determine based on road traffic information whether a traffic hazard occurs on a guidance route;
    a detour exploring portion configured to explore a detour to avoid a section in which the traffic hazard occurs using map data at a level lower than a predetermined level when the traffic hazard determining portion determines that the traffic hazard occurs; and
    a display control portion configured to control displaying such that the detour explored with the detour exploring portion is zoomed in order to match a scale of the detour to a scale of a currently displayed map image designated by a user, and is synthesized and displayed on the currently displayed map image;
    wherein the detour exploring portion is configured to determine based on a vehicle current location whether a vehicle has reached a point on the guidance route that precedes the traffic hazard, and when it is determined that the vehicle has reached the point, the detour exploring portion is configured to explore the detour to avoid the traffic hazard; and, wherein the scale of the currently displayed map image does not change when the detour is displayed on the currently displayed map image.

2. The navigation device according to claim 1, wherein the map data at the level lower than the predetermined level stores road network data including a narrow street.

3. The navigation device according to claim 1, wherein the display control portion controls displaying such that only the detour explored with the detour exploring portion is synthesized and displayed from among roads included in the map data at the level lower than the predetermined level.

4. The navigation device according to claim 1, wherein the display control portion controls displaying such that the detour is synthesized and displayed while a display of the guidance route is maintained.

5. The navigation device according to claim 1, wherein the display control portion controls displaying such that the detour explored with the detour exploring portion is displayed in a display form different from roads included in the currently displayed map image.

6. The navigation device according to claim 1, wherein the detour exploring portion explores a plurality of detours to avoid the section in which the traffic hazard occurs, and
wherein the display control portion controls displaying such that the detours explored with the detour exploring portion are synthesized and displayed.

7. The navigation device according to claim 6, wherein the detour exploring portion explores a lowest-cost detour from among the detours to avoid the section in which the traffic hazard occurs, and explores another detour connecting to the lowest-cost detour in order to explore the detours.

8. A control method for displaying a detour comprising:
determining, using a traffic hazard determining portion of a navigation device, based on road traffic information, whether a traffic hazard occurs on a guidance route;
exploring, using a detour exploring portion of the navigation device, a detour to avoid a section in which the traffic hazard occurs using map data at a level lower than a predetermined level when the traffic hazard determining portion determines that the traffic hazard occurs; and
controlling, using a display control portion of the navigation device, displaying such that the detour explored with the detour exploring portion is zoomed in order to match a scale of the detour to a scale of a currently displayed map image designated by a user, and is synthesized and displayed on the currently displayed map image;
wherein the detour exploring portion is configured to determine based on a vehicle current location whether a vehicle has reached a point on the guidance route that precedes the traffic hazard, and when it is determined that the vehicle has reached the point, the detour exploring portion is configured to explore the detour to avoid the traffic hazard; and,
wherein the scale of the currently displayed map image does not change when the detour is displayed on the currently displayed map image.

9. The control method for displaying a detour according to claim 8,
wherein the map data at the level lower than the predetermined level stores road network data including a narrow street.

10. A navigation device comprising:
a traffic hazard determining portion configured to determine based on road traffic information whether a traffic hazard occurs on a guidance route;
a detour exploring portion configured to explore a detour to avoid a section in which the traffic hazard occurs using map data at a level lower than a predetermined level when the traffic hazard determining portion determines that the traffic hazard occurs;
a display control portion configured to control displaying such that the detour explored with the detour exploring portion is zoomed in order to match a scale of the detour to a scale of a currently displayed map image designated by a user, and is synthesized and displayed on the currently displayed map image;
a hazard section determining portion configured to determine whether an entirety of the section in which the traffic hazard occurs is included in a screen of the map image currently displayed when the traffic hazard determining portion determines that the traffic hazard occurs; and
a scale changing portion configured to change the scale of the currently displayed map image to a scale at which the entirety of the section in which the traffic hazard occurs is included in a screen when the hazard section determining portion determines that the entirety of the section in which the traffic hazard occurs is not included in the screen of the map image currently displayed,
wherein the display control portion controls displaying such that the detour explored with the detour exploring portion is zoomed in order to match the scale of the detour to the scale changed with the scale changing portion, and is synthesized and displayed on a map at the changed scale.

11. The navigation device according to claim 10, wherein the map data at the level lower than the predetermined level stores road network data including a narrow street.

12. The navigation device according to claim 10, wherein the display control portion controls displaying such that only the detour explored with the detour exploring portion is synthesized and displayed from among roads included in the map data at the level lower than the predetermined level.

13. The navigation device according to claim 10, wherein the display control portion controls displaying such that the detour is synthesized and displayed while a display of the guidance route is maintained.

14. The navigation device according to claim 10, wherein the display control portion controls displaying such that the detour explored with the detour exploring portion is displayed in a display form different from roads included in the currently displayed map image.

15. The navigation device according to claim 10, wherein the detour exploring portion explores a plurality of detours to avoid the section in which the traffic hazard occurs, and
wherein the display control portion controls displaying such that the detours explored with the detour exploring portion are synthesized and displayed.

16. The navigation device according to claim 15, wherein the detour exploring portion explores a lowest-cost detour from among the detours to avoid the section in which the traffic hazard occurs, and explores another detour connecting to the lowest-cost detour in order to explore the detours.

* * * * *